Figures 1, 2:
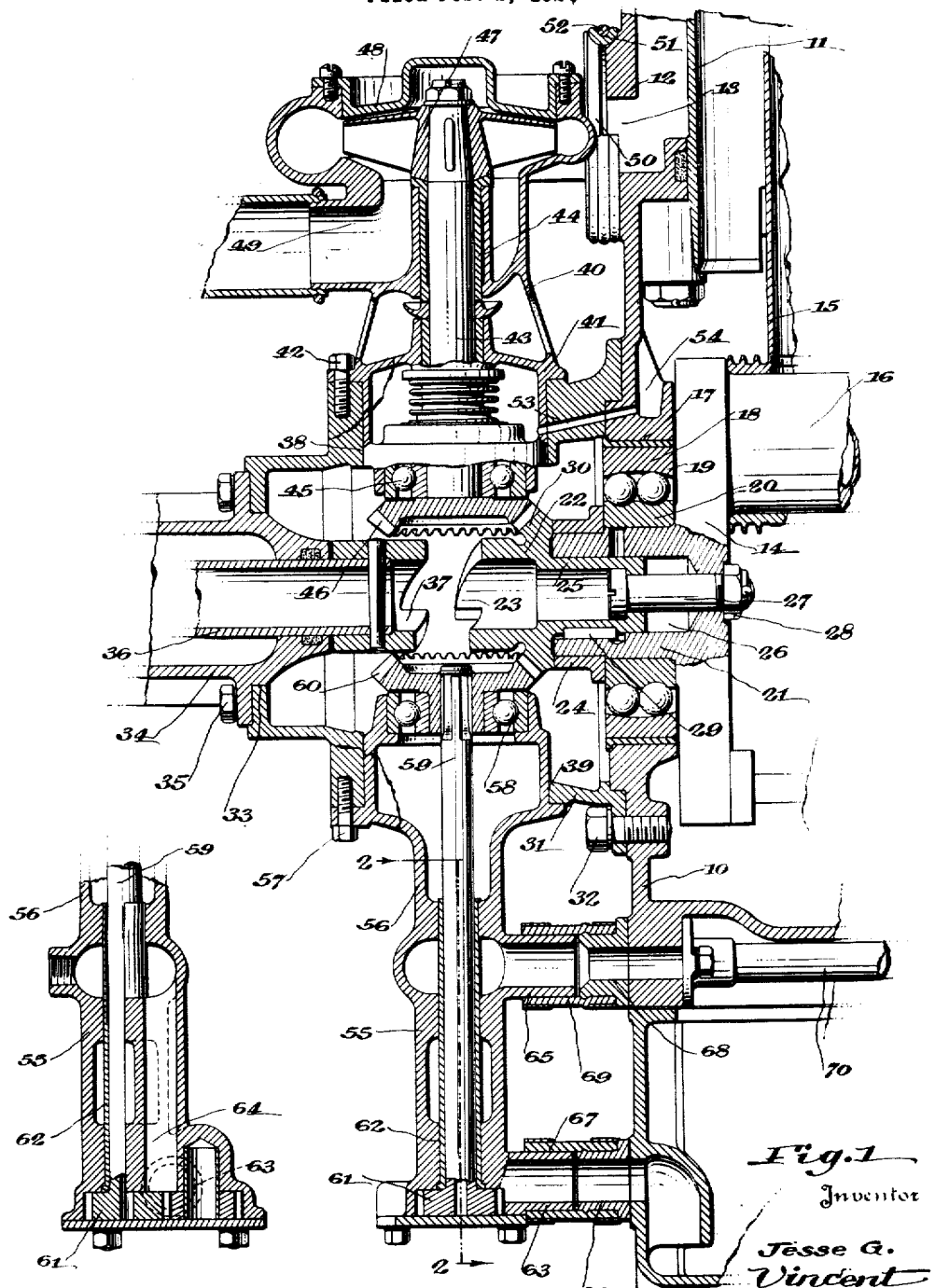

March 6, 1928.

J. G. VINCENT 1,661,550

INTERNAL COMBUSTION ENGINE

Filed Feb. 2, 1924

Inventor

Jesse G. Vincent

By Mellon Tillotts

Attorney

Patented Mar. 6, 1928.

1,661,550

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

INTERNAL-COMBUSTION ENGINE.

Application filed February 2, 1924. Serial No. 690,328.

This invention relates to internal combustion engines and particularly to the crankcase, crankshaft, and pump constructions.

One of the objects of the invention is to provide a simple and easily manufactured crankcase and pump construction.

Another object of the invention is to provide separate pump units with short pipe connections to the crankcase and cylinders.

Another object of the invention is to group the various pump shafts around the end of the crankshaft for simple drive connections and for easy removal and assembly of the parts.

Other objects of the invention will appear from the following description taken in connection with the drawings, which form a part of this specification, and in which:

Fig. 1 is a vertical sectional view through one end of an internal combustion engine embodying the invention, and Fig. 2 is a vertical section substantially on the line 2—2 of Fig. 1.

Referring to the drawings, 10 represents the crankcase of an internal combustion engine and 11 is one of the cylinders which is water jacketed as shown at 12. In this instance the water jacket 12 is formed as an integral casting with the crankcase but this particular construction is not an essential part of the invention. The inlet opening for the water jacket 12 is indicated at 13.

The engine crankshaft is shown at 14 and one of the connecting rods 15 is mounted on one of the crank throws 16. The end of the crankshaft 14 extends through an opening 17 formed in the end of the crankcase and which opening is adapted to receive a crankshaft bearing 18 which is shown as a double row ball bearing having inner and outer rings. The outer ring is numbered 19 and the inner ring 20. The inner ring rests directly upon the end 21 of the crankshaft and it is retained thereon by a device 22 which may be called a clutch device because it is provided with jaws 23 for the starting crank. This clutch device has a ring 24 mounted between it and the inner ring 20 of the bearing and the device thus abuts against the bearing and retains it on the crankshaft end. The device 22 also has a part 25 which extends into a recess 26 formed in the crankshaft end. The device is retained in place by a bolt 27 which extends through the inner end of the device and through the crankshaft and is provided with a nut 28. A key 29 prevents the device 22 from turning relative to the crankshaft end. The device 22 is also formed with a bevel gear 30 thereon so that the crankshaft may, through the device 22, drive the water and oil pumps hereinafter described.

A support or casing 31 is detachably connected to the end of the crankcase as by a series of bolts 32, this casing extending around the projecting end of the crankshaft and housing it and the clutch device 22. The casing is provided with an opening 33 in line with the crankshaft end and a bracket 34 connected to the casing as by bolts 35, supports a starting crank 36 in alignment with the axis of the crankshaft. The starting crank 36 has a jaw piece 37 which is adapted to clutch with the jaws 23 of the device 22 for cranking the engine in the usual way.

The casing 31 is also formed with upper and lower openings 38 and 39 respectively, for receiving the water and oil pump units. The water pump unit is indicated generally at 40 and comprises a bracket 41 which extends into the opening 38 and is secured to the casing 31 as by two or more bolts 42. The cutaway section at the left side of the bracket 41, showing one of the bolts 42, is preferably at right angles to the main section and is for the purpose of illustrating this bolted-on construction.

The bracket 41 has suitable bearings for a pump shaft 43, the upper bearing or bushing being shown at 44 and the lower bearing being in the form of an annular ball bearing 45. The lower end of the shaft 43 has a bevel gear 46 which meshes with bevel gear 30 on the crankshaft, and the upper end of the shaft 43 has a pump impeller 47 secured to it, which impeller operates in a pump casing 48 which is formed at the upper end of the bracket 41. The bracket 41 has an inlet opening 49 for the pump casing and its outlet opening 50 is arranged adjacent the water inlet 13 of the cylinder jacket 12. A connection in the form of a thick rubber band 51 connects the openings 50 and 13, a wire 52 retaining the band 51 in place. Lubrication for the bearing 45 may be through an inclined passage 53 extending from a pocket 54 inside of the crankcase.

The lower pump unit is indicated generally at 55, this being the oil pump. It comprises a bracket 56 which is detachably secured in the opening 39 by two or more bolts 57. At its upper end the bracket supports an annular ball bearing 58 for the upper end of a shaft 59 which has a bevel gear 60 thereon meshing with gear 30 on the end of the crankshaft. The shaft 59 extends downwardly through a downwardly extending part of the bracket 56, to a gear pump 61 in the lower end of the bracket. A long bushing 62 supports the rear end of this shaft 59 as shown in the drawings. The bracket 56 is formed at its lower end with an inlet boss 63 for the pump 61 and a passage 64 leads upwardly from the outlet side of the pump 61 to an outlet boss 65. When the pump unit 55 is in place on the engine the boss 63 is positioned adjacent an outlet boss 66 from the crankcase 10 and a connection 67 secures the bosses 63 and 66 together to form a continuous passage. Also, the boss 65 is positioned adjacent an inlet boss 68 in the crankcase 10 and a connection 69 forms a continuous passage from the boss 65 to the boss 68 so that oil may be pumped under pressure to a pipe 70 which connects with the various bearings of the engine.

It will be seen that by removing the connections 51, 67 and 69 and by disconnecting the casing 31 from the crankcase, both pump units and the starting crank may be lifted off of the crankcase for replacement or repair. Likewise, the pump units 40 and 55 are independently removable without disturbing the other parts of the engine.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an internal combustion engine, the combination with a crankcase having a bearing in one end, and a crankshaft mounted in said bearing and projecting therethrough beyond the crankcase, of a casing detachably secured to the crankcase and surrounding the projecting end of said crankshaft, said casing having aligned openings above and below the crankshaft end, a bracket secured to the casing in each of said openings, and shafts in said brackets geared to said crankshaft.

2. In an internal combustion engine, the combination with the crankcase having inlet and outlet or openings, of a pump unit supported by said crankcase on the outside thereof and having inlet and outlet bosses arranged adjacent said openings, and means connecting the outlet of the crankcase with the inlet of the pump and the outlet of the pump with the inlet of the crankcase.

3. In an internal combustion engine, the combination with the crankcase thereof having an oil outlet boss near its lower part and an inlet boss adjacent thereto, of a pump unit detachably supported on the outside of the crankcase and having an inlet boss arranged adjacent the outlet boss of the crankcase and having an outlet boss arranged adjacent the inlet boss of said crankcase, and means connecting the crankcase and pump unit bosses, substantially as shown and described.

4. In an internal combustion engine, the combination with the crankcase having a main bearing, and having an oil outlet boss adjacent its lower part and an oil inlet boss between said outlet boss and said bearing, and a crankshaft mounted in said bearing, of an oil pump unit detachably connected to said crankcase and driven by said crankshaft, said pump unit extending downwardly adjacent said bosses and having inlet and outlet bosses connected with the crankcase bosses.

5. In an internal combustion engine, the combination with the crankcase and cylinder, said cylinder being water jacketed, of a water pump unit detachably supported on the crankcase and having its outlet in proximity to the inlet of the cylinder jacket, and means connecting the outlet from the pump with the inlet of the cylinder jacket.

6. In an internal combustion engine, the combination with the crankcase and the engine cylinder having a water jacket, said crankcase having oil connections, of means mounted at the end of the crankcase for supporting water and oil pumps, a water pump unit mounted on said means and having its outlet connected to said cylinder jacket, and an oil pump mounted on said means and having inlet and outlet connections with said oil connections.

7. In an internal combustion engine, the combination with the crankshaft having a recessed end, of a clutch jaw piece having a part extending into said recessed end of the crankshaft, and longitudinal means for connecting the clutch piece to the crankshaft.

8. In an internal combustion engine, the combination with the crankshaft having a recessed end, of a clutch jaw piece having a part extending into said recessed end of the crankshaft, and a bolt connecting the inner end of said clutch piece with the crankshaft.

9. In an internal combustion engine, the combination with the crankcase having a bearing supporting part, and a ball bearing therein having inner and outer bearing rings, of a crankshaft having a drilled-out end extending into the inner ring of said bearing, a clutch device having means for retaining said inner ring on said crankshaft end, and means securing said clutch device to the crankshaft.

10. In an internal combustion engine, the combination with a crankshaft bearing and a crankshaft, of means for retaining said bearing on said crankshaft comprising a clutch device having a part abutting against said bearing and having a part extending into a recess in said crankshaft, and a bolt extending through said clutch device and into said crankshaft to retain the device on said crankshaft.

11. In an internal combustion engine, the combination with a crank case and a crank shaft, of a bearing for the crank shaft, a combined clutch and driving gear securing the bearing to the crank shaft, an oil pump unit supported by the crank case and connected therewith and a driving connection between the oil pump unit and the driving gear.

In testimony whereof I affix my signature.

JESSE G. VINCENT.

extending into the inner ring of said bearing, a clutch device having means for retaining said inner ring on said crankshaft end, and means securing said clutch device to the crankshaft.

10. In an internal combustion engine, the combination with a crankshaft bearing and a crankshaft, of means for retaining said bearing on said crankshaft comprising a clutch device having a part abutting against said bearing and having a part extending into a recess in said crankshaft, and a bolt extending through said clutch device and into said crankshaft to retain the device on said crankshaft.

11. In an internal combustion engine, the combination with a crank case and a crank shaft, of a bearing for the crank shaft, a combined clutch and driving gear securing the bearing to the crank shaft, an oil pump unit supported by the crank case and connected therewith and a driving connection between the oil pump unit and the driving gear.

In testimony whereof I affix my signature.

JESSE G. VINCENT.

CERTIFICATE OF CORRECTION.

Patent No. 1,661,550.  Granted March 6, 1928, to

JESSE G. VINCENT.

It is hereby certified that error appears in the printed specification of the above numbered patent requiring correction as follows: Page 2, line 63, claim 2, for the word "or" read "oil"; and that the said Letters Patent should be read with this correction therein that the same may conform to the record of the case in the Patent Office.

Signed and sealed this 17th day of July, A. D. 1928.

(Seal)

M. J. Moore,
Acting Commissioner of Patents.

CERTIFICATE OF CORRECTION.

Patent No. 1,661,550.                           Granted March 6, 1928, to

JESSE G. VINCENT.

It is hereby certified that error appears in the printed specification of the above numbered patent requiring correction as follows: Page 2, line 63, claim 2, for the word "or" read "oil"; and that the said Letters Patent should be read with this correction therein that the same may conform to the record of the case in the Patent Office.

Signed and sealed this 17th day of July, A. D. 1928.

M. J. Moore,
Acting Commissioner of Patents.

(Seal)